United States Patent
Oku (10) Patent No.: US 8,264,280 B2
(45) Date of Patent: Sep. 11, 2012

(54) LOAD DRIVING CIRCUIT

(75) Inventor: Koichiro Oku, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 469 days.

(21) Appl. No.: 12/458,270

(22) Filed: Jul. 7, 2009

(65) Prior Publication Data
US 2010/0014196 A1     Jan. 21, 2010

(30) Foreign Application Priority Data
Jul. 17, 2008   (JP) ................................ 2008/186257

(51) Int. Cl.
*H02H 7/00* (2006.01)
*H02H 7/20* (2006.01)

(52) U.S. Cl. ........ 330/298; 318/731; 318/732; 318/434; 361/1; 361/18; 361/23; 361/33; 323/274; 323/276; 323/267

(58) Field of Classification Search .................. 318/727, 318/731, 732, 434; 361/1, 18, 23, 33; 323/274, 323/276, 267; 330/298
See application file for complete search history.

(56) References Cited

U.S. PATENT DOCUMENTS

| | | | | |
|---|---|---|---|---|
| 5,563,479 A * | 10/1996 | Suzuki | ........................... | 318/139 |
| 5,694,010 A * | 12/1997 | Oomura et al. | ........... | 318/400.07 |
| 6,222,355 B1 * | 4/2001 | Ohshima et al. | ............... | 323/282 |
| 6,236,122 B1 * | 5/2001 | Maeda et al. | .................. | 307/125 |
| 7,099,127 B2 * | 8/2006 | Chuang et al. | ................... | 361/18 |
| 7,443,148 B2 * | 10/2008 | Weng | ............................. | 323/271 |
| 7,889,011 B2 * | 2/2011 | Nyboe et al. | ................... | 330/298 |

FOREIGN PATENT DOCUMENTS
JP           7-87771        3/1995
* cited by examiner

*Primary Examiner* — Rita Leykin
(74) *Attorney, Agent, or Firm* — McGinn IP Law Group, PLLC (57) ABSTRACT

Detection accuracy of a short circuit state in a load driving circuit is improved thereby operation efficiency of a motor may be enhanced. A gate control circuit 25 turns off NMOS transistors Q1 and Q4, turns on an NMOS transistor Q3, and turns on and off an NMOS transistor Q2 intermittently so as to control rotation of a motor 10. A detection circuit 30a detects a voltage Va at a connection node a between the NMOS transistor Q2 and the motor 10 a predetermined time after the NMOS transistor Q2 is turned on. A control circuit 20 turns off the NMOS transistor Q2 so as to cut off a current from a power supply to the motor 10 if the voltage Va at the connection node a is within a range in which the motor 10 is determined to be short-circuited.

20 Claims, 8 Drawing Sheets

LOAD DRIVING CIRCUIT

CROSS-REFERENCE TO RELATED APPLICATIONS

This application is based upon, claims the benefit of priority of, and incorporates by reference the contents of Japanese Patent Application No. 2008-186257 filed on Jul. 17, 2008.

BACKGROUND

1. Field of the Invention

The present invention relates to a load driving circuit, in particular, a circuit for driving an inductive load.

2. Description of Related Art

An inductive load such as a motor or a solenoid used in a field of electrical equipment for automobiles or other fields is usually connected to a circuit board via connectors and wiring lines. If a short circuit occurs in such a load as described above, an excessive current may flow in a switching device such as a transistor for controlling the load. If the excessive current continues to flow in the switching device, the switching device may be broken down.

Therefore, a protection circuit is usually provided for turning off the switching device to cut off the excessive current when a short circuit occurs in the load. For instance, Japanese Patent Application Laid-open No. Hei 7-87771 (hereinafter referred to as Sawano) discloses a motor speed and position estimating device having a function of prohibiting motor drive when an excessive current flowing in the motor as a load is detected. This motor speed and position estimating device includes four switching devices that are connected in an H-bridge and are driven by a pulse width modulation method (PWM method), a motor connected in a middle portion of the H-bridge, and a shunt resistor that is connected in series to the switching device of the H-bridge. A motor current is detected from a voltage across the shunt resistor. If the motor current is an excessive current, the drive of the motor is prohibited.

The analysis described below is given in the present invention.

In the device of Sawano, a current sensing resistor (shunt resistor) is inserted in series to the motor as a load, and an excessive current is detected based on a voltage drop across the current sensing resistor. In this structure, the connection of the current sensing resistor in series to the load causes deterioration of operation efficiency of the load. For instance, it is supposed that the motor has an internal resistance of 70 milliohms, each metal-oxide semiconductor field-effect transistor (MOSFET) as the switching device has an ON resistance of 10 milliohms, the current sensing resistor has a resistance of 10 milliohms, and a power supply voltage (VDD) is 10 volts. Then, a voltage of approximately 7.8 volts may be applied across the motor without the current sensing resistor, but a voltage of only 7 volts may be applied across the motor with the current sensing resistor. This may cause a drop in motor rotation speed (depending on the applied voltage) and torque (depending on motor current). In order to improve the motor rotation speed and the torque, it is necessary to decrease the resistance of the current sensing resistor extremely. In this case, a size of the resistor element having a low resistance will be large, which may cause an increase in area of a circuit board. In addition, it may also cause an increase in cost thereof.

SUMMARY

A load driving circuit according to one aspect of the present invention includes: a switching device for intermittently connecting an inductive load to a power source; a detection circuit for detecting a voltage at a connection node between the switching device and the inductive load a predetermined time after the switching device connects the inductive load to the power source; and a control circuit for controlling the switching device so as to cut off power supply to the inductive load in accordance with the detected voltage at the connection node.

According to the present invention, the voltage at the connection node between the switching device and the load is detected, whereby high operation efficiency of the load may be obtained.

BRIEF DESCRIPTION OF THE DRAWINGS

The above-mentioned and other objects, advantages and features of the present invention become more apparent from the following description of certain preferred embodiments taken in conjunction with the accompanying drawings, in which.

DETAILED DESCRIPTION OF THE PREFERRED EMBODIMENTS

The invention is described herein with reference to illustrative embodiments. Those skilled in the art would recognize that many alternative embodiments can be accomplished using the teachings of the present invention and that the invention is not limited to the embodiments illustrated for explanatory purposes.

A load driving circuit according to an embodiment mode of the present invention includes a switching device (Q2) for intermittently connecting an inductive load (10) to a power source, a detection circuit (30a, 30b, 30c) for detecting a voltage at a connection node between the switching device and the load a predetermined time after the switching device connects the load to the power source, and a control circuit (20) for controlling the switching device so as to cut off power supply to the load in accordance with the detected voltage at the connection node.

The control circuit may control the switching device so as to cut off the power supply to the load if the voltage at the connection node has a value within a range in which the load is determined to be short-circuited.

The detection circuit may include a comparator circuit (COMP) for comparing the voltage at the connection node with a predetermined voltage, so as to detect the voltage at the connection node based on a result of the comparison by the comparator circuit.

The detection circuit may further include a charging and discharging circuit with a capacitor element (C1). After the switching device connects the load to the power source, charging and discharging of the capacitor element is started. After that, the comparator circuit compares the voltage at the connection node with charging and discharging end voltage of the capacitor element as the predetermined voltage.

The charging and discharging circuit may include a constant current circuit (32) so as to charge and discharge the capacitor element with a current from the constant current circuit.

In addition, the charging and discharging circuit may include a resistor element (R1) so as to charge and discharge the capacitor element with a current from the power supply via the resistor element.

Using the load driving circuit described above, it is possible to cut off power supply to the load before a large current flows in the switching device when a short circuit occurs in the the load. According to the load driving circuit having the above-mentioned structure, a current sensing resistor is not connected in series to the load. Therefore, high operation efficiency of the load may be obtained.

Hereinafter, embodiments of the present invention are described in detail with reference to the attached drawings.

First Embodiment

Figure 1:
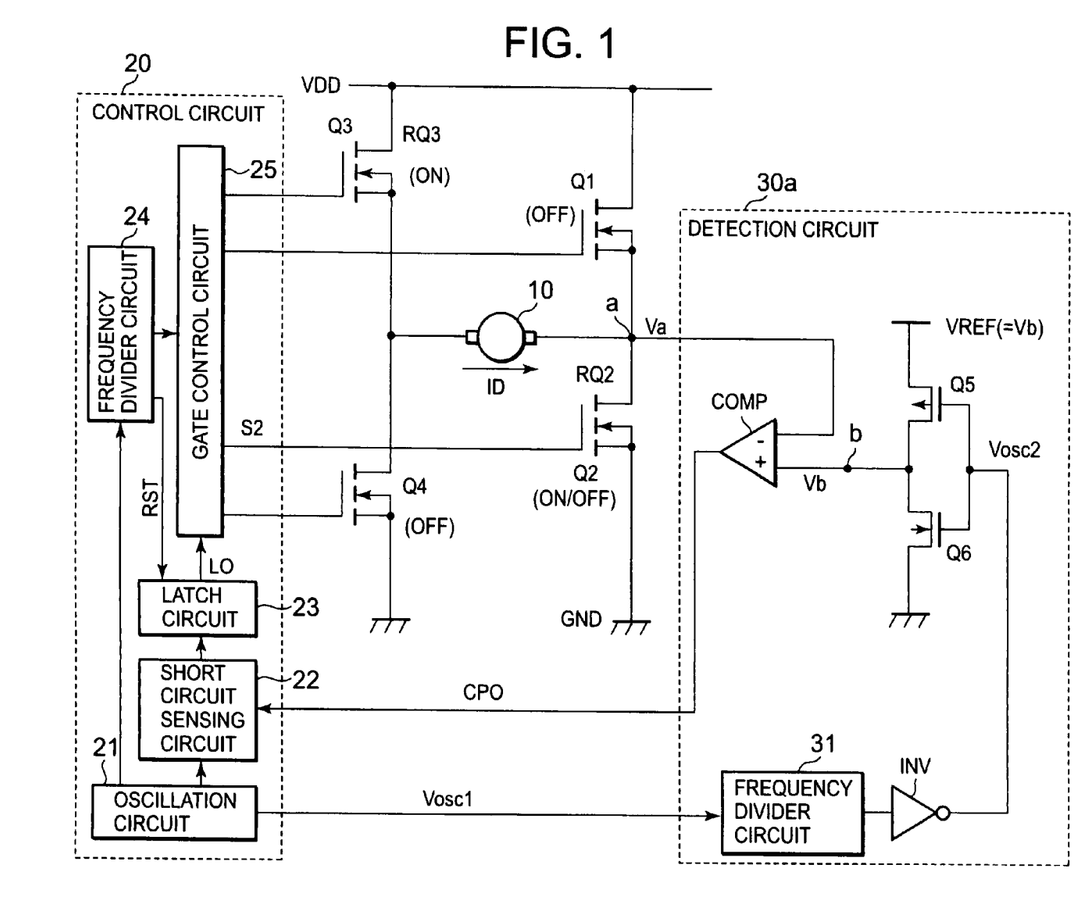
FIG. 1 is a block diagram illustrating a structure of a load driving circuit according to a first embodiment of the present invention.

FIG. 1 is a block diagram illustrating a structure of a load driving circuit according to a first embodiment of the present invention. In FIG. 1, the load driving circuit includes NMOS transistors Q1 to Q4, a control circuit 20 and a detection circuit 30a, and is connected to a motor 10. The NMOS transistor Q1 has a drain connected to a power source VDD, and a source connected to one end (node a) of the motor 10. The NMOS transistor Q2 has a drain connected to the one end (node a) of the motor 10, and a source connected to aground (GND). The NMOS transistor Q3 has a drain connected to the power source VDD, and a source connected to the other end of the motor 10. The NMOS transistor Q4 has a drain connected to the other end of the motor 10, and a source connected to the ground (GND). The control circuit 20 controls individual gates of the NMOS transistors Q1 to Q4 so as to turn on and off the individual transistors. The detection circuit 30a detects a voltage Va at the node a at a predetermined timing and delivers to the control circuit 20 a comparison result signal CPO as a detection result signal indicating that a short circuit in the motor 10 is detected.

The control circuit 20 includes an oscillation circuit 21, a short circuit sensing circuit 22, a latch circuit 23, a frequency divider circuit 24, and a gate control circuit 25. The oscillation circuit 21 generates an operating clock signal for the load driving circuit and supplies the operating clock signal to the detection circuit 30a, the short circuit sensing circuit 22 and the frequency divider circuit 24. The frequency divider circuit 24 divides frequency of the operating clock signal so as to deliver the divided frequency signal as a reset signal RST to the latch circuit 23, and to deliver the divided frequency signal also to the gate control circuit 25. The short circuit sensing circuit 22 receives the comparison result signal CPO from the detection circuit 30a in synchronization with timing of the operating clock signal, and delivers a detection signal to the latch circuit 23. The latch circuit 23 latches the detection signal output by the short circuit sensing circuit 22 and outputs the latched detection signal as a latch signal LO to the gate control circuit 25. In addition, the latch signal LO is reset by the reset signal RST.

In a normal operation of the motor 10, the gate control circuit 25 turns off the NMOS transistors Q1 and Q4, turns on the NMOS transistor Q3, and turns on and off the NMOS transistor Q2 by a signal S2 with pulse width modulation (PWM), so as to control rotation of the motor 10. In addition, in order to rotate the motor 10 reversely, the NMOS transistors Q1 and Q4 are turned on while the NMOS transistors Q2 and Q3 are turned off.

In addition, the gate control circuit 25 turns off all the NMOS transistors Q1 to Q4 when a short circuit occurs in the motor 10.

The detection circuit 30a includes a frequency divider circuit 31, an inverter INV, a comparator COMP, a PMOS transistor Q5 and an NMOS transistor Q6. The frequency divider circuit 31 divides frequency of an oscillation signal Vosc1 of the oscillation circuit 21, and supplies a signal Vosc2 with the divided frequency to gates of the PMOS transistor Q5 and the NMOS transistor Q6. Note that the signal S2 is synchronized with the signal Vosc2. The PMOS transistor Q5 has a source to which a voltage VREF is applied and a drain connected to a noninverting input terminal (+) of the comparator COMP (node b). The NMOS transistor Q6 has a source connected to the ground and a drain connected to the noninverting input terminal (+) of the comparator COMP (node b). The comparator COMP has an inverting input terminal (−) connected to the one end (node a) of the motor 10, and an output terminal from which the comparison result signal CPO is output to the short circuit sensing circuit 22. The short circuit sensing circuit 22 determines a detection time point using a timing of the signal Vosc1, and detects the comparison result signal CPO at the detection time point so as to determine whether the motor 10 is in a normal state or a short circuit state.

Figure 2A:
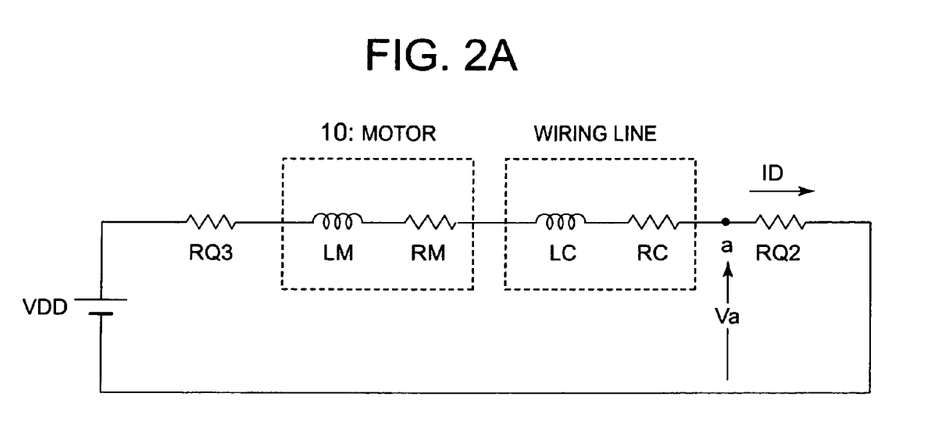
FIG. 2A is an equivalent circuit diagram of a motor and a periphery thereof in a normal state.
Figure 2B:
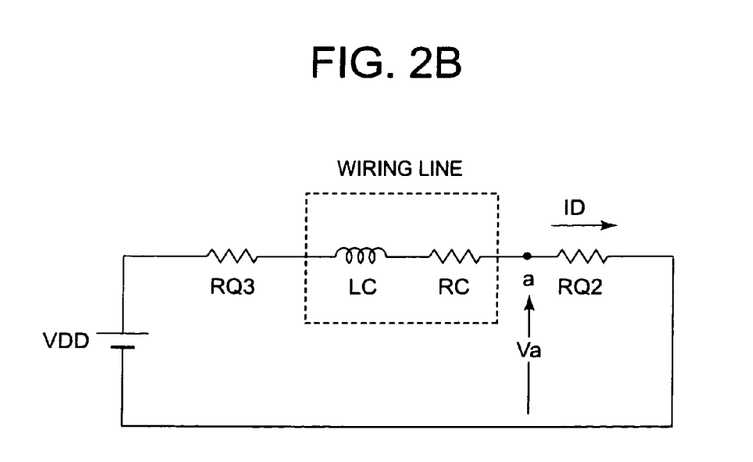
FIG. 2B is an equivalent circuit diagram of the motor and the periphery thereof in a load short circuit state.

Next, an operation of the load driving circuit is described. FIGS. 2A and 2B are equivalent circuit diagrams of the motor and its periphery illustrated in FIG. 1 in the normal state and in the load short circuit state, respectively. Here, RQ3 and RQ2 denote ON resistances of the NMOS transistors Q3 and Q2, respectively. LM and RM respectively denote inductance and internal resistance of the motor 10. LC and RC respectively denote inductance and internal resistance of a wiring line from the power source VDD to the ground via the motor 10.

When the NMOS transistor Q2 is turned on in the normal state, a motor current ID flows in a closed circuit including impedance (LM and RM) of the motor. The motor current ID at this time point is expressed by the following equation (1) with reference to FIG. 2A.

$$ID = \frac{VDD}{RQ3 + RQ2 + RM + RC} \cdot \left(1 - \exp\left(-\frac{RQ3 + RQ2 + RM + RC}{LM + LC} \cdot t\right)\right), \quad (1)$$

In contrast, when a short circuit occurs in the motor, values of LM and RM become both zero, and the motor current ID is expressed by the following equation (2) with reference to FIG. 2B.

$$ID = \frac{VDD}{RQ3+RQ2+RC} \cdot \left(1 - \exp\left(-\frac{RQ3+RQ2+RC}{LC} \cdot t\right)\right) \quad (2)$$

In general, the inductance LM of the motor is sufficiently larger than the inductance LC of the wiring line, and the internal resistance RM of the motor is sufficiently larger than the ON resistances RQ3 and RQ2 of the NMOS transistors Q3 and Q2 and the resistance RC of the wiring line. Note that the resistance RC of the wiring line is sufficiently smaller than the ON resistances RQ3 and RQ2.

Figure 3:
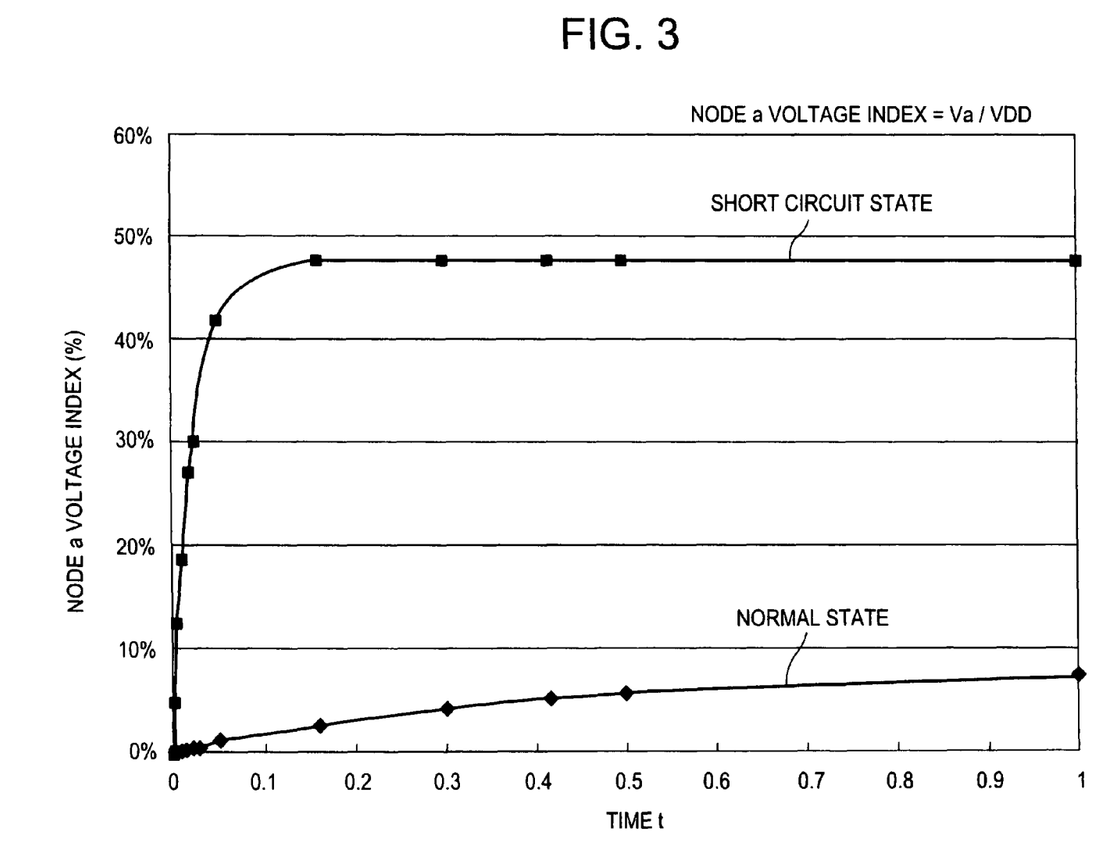
FIG. 3 is a graph illustrating voltage variations with time at a node a in the normal state and in the load short circuit state.

Therefore, when a short circuit occurs in the motor 10 so that the impedance of the motor 10 becomes substantially zero, the motor current ID behaves in a different manner so that the voltage Va generated at the node a also changes significantly. FIG. 3 illustrates a time variation of the voltage Va (drain voltage of the NMOS transistor Q2) in the case where the motor 10 becomes the normal state or the short circuit state.

In FIG. 3, the horizontal axis represents elapsed time t from turning on of the NMOS transistor Q2, and the vertical axis represents a ratio (%) of the voltage Va generated at the node a to a voltage of the power source VDD. Here, it is supposed that VDD=10 volts, RQ2=RQ3=0.1 ohms, RM=1 ohm, RC=0.01 ohms, LM=0.5 henries, and LC=0.005 henries. At a time point of t=0, the motor current ID is zero, which is the same value between in the normal state and in the load short circuit state, but the motor current ID becomes different therebetween as the time t passes. This is caused by a difference between inductance components in the closed circuit. If the inductance component is included, the motor current ID varies as a function of time due to the term of exp(−t/L) (L denotes inductance) as shown in the equations (1) and (2). A variation amount of the motor current ID is small if the value of L is large while the variation amount of the motor current ID is large if the value of L is small. For instance, if the closed circuit includes a load made up of only resistors, i.e., L=0, the motor current ID rises without delay when the NMOS transistor Q2 is turned on.

If the motor 10 is in the normal state, the closed circuit includes the inductance LM of the motor 10, whereby the voltage at the node a has a gradient due to an inductance of LM+LC. On the other hand, the load short circuit state does not have the inductance LM anymore, and the value of LM is sufficiently larger than the value of LC. Therefore, the motor current ID rises significantly quickly so that the voltage Va at the node a also rises rapidly.

In addition, in a case of t=∞, the voltage Va at the node a is not affected by the inductance and is determined only by the resistance component. The voltage Va at the node a in the case of t=∞ becomes VDD×RQ2/(RQ3+RQ2+RM+RC). In the normal state, RQ2 is sufficiently smaller than RQ2+RQ3+ RM+RC, and hence the voltage Va at the node a becomes substantially zero (=ID×RQ2). On the contrary, in the short circuit state, RM becomes zero, and RM is sufficiently larger than RQ2+RQ3+RC (in addition, RC is sufficiently smaller than RQ2, and RC is sufficiently smaller than RQ3), and hence the voltage Va at the node a is saturated substantially at VDD/2 (approximately 50%).

Figure 4:
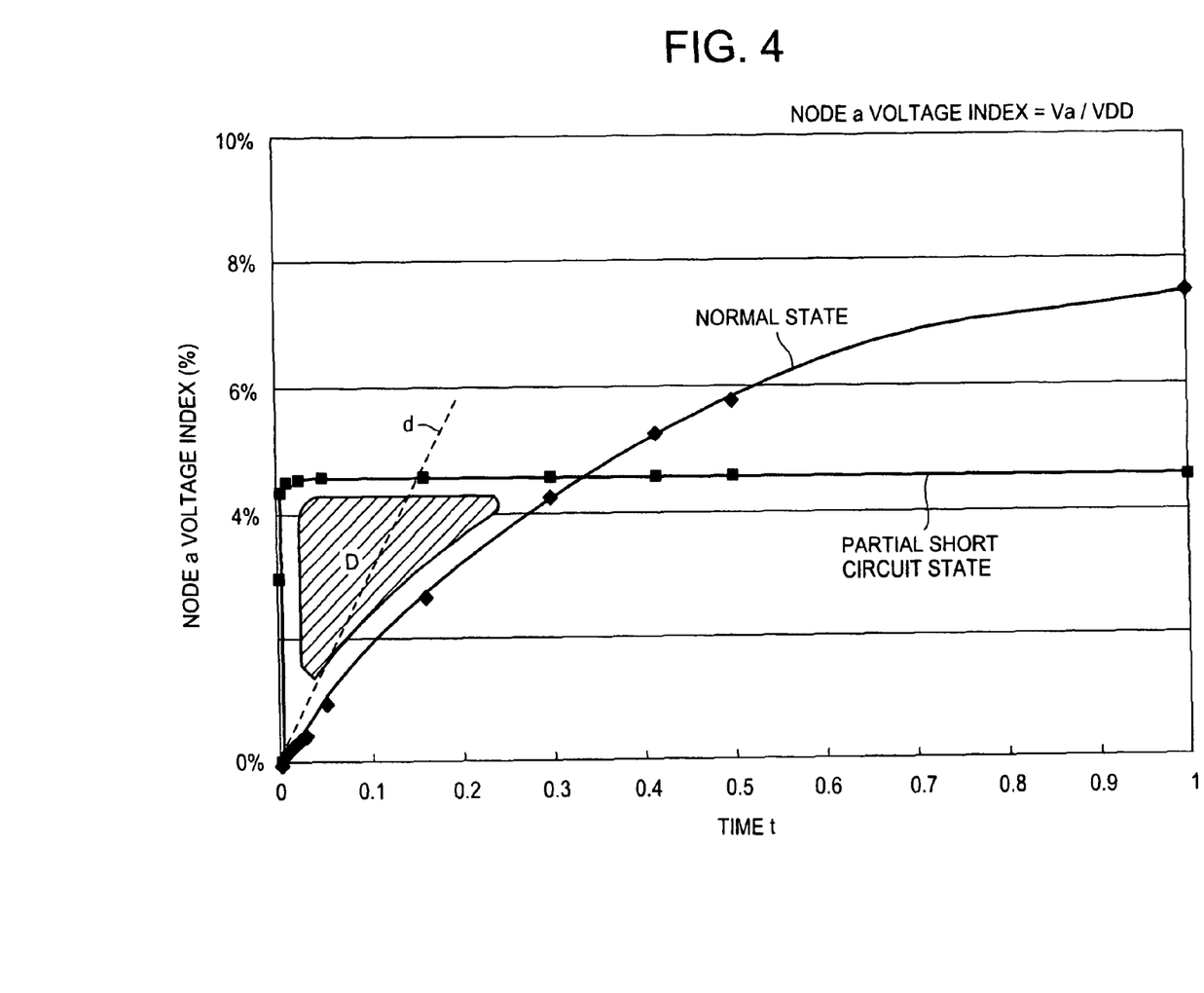
FIG. 4 is a graph illustrating voltage variations with time at the node a in the normal state and in a partial short circuit state.

If the motor 10 becomes to have a partial short circuit or the like, i.e., a short circuit with a certain resistance component, the motor current ID is smaller than a case of a total short circuit. In this case, a saturation value of the voltage Va decreases as illustrated in FIG. 4. However, the motor current ID rises more quickly than in the normal state of the motor 10 because the inductance component of the motor 10 is substantially zero.

Thus, considering a case of the partial short circuit, a voltage Vb to be compared and a detection time point indicating a comparison time are set approximately within a range D illustrated in FIG. 4, whereby the load short circuit state including the partial short circuit state may be distinguished from the normal state.

Figure 5:
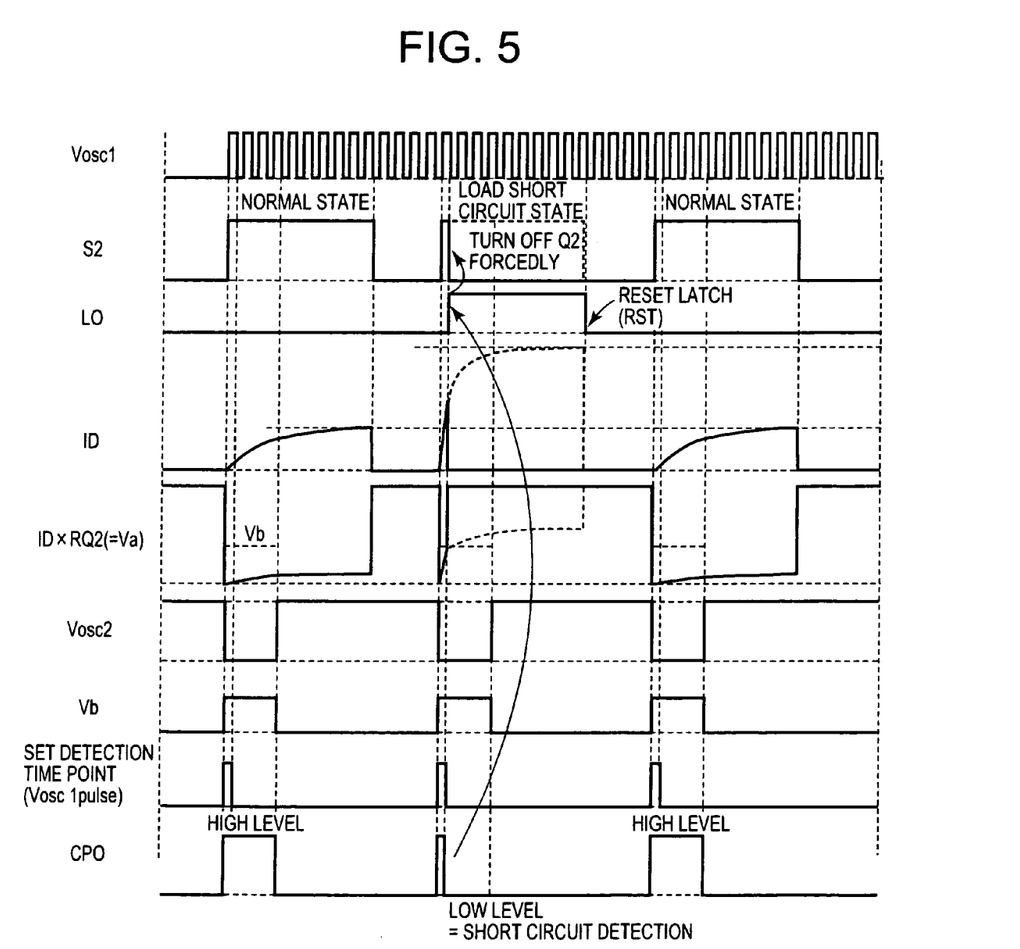
FIG. 5 is a timing chart illustrating an operation of the load driving circuit according to the first embodiment of the present invention.

FIG. 5 is a timing chart illustrating an operation of the load driving circuit according to the first embodiment of the present invention. In FIG. 5, the signal Vosc1 indicates an oscillation waveform output from the oscillation circuit 21. The signal S2 is a gate signal of the NMOS transistor Q2, and the NMOS transistor Q2 is turned on when the signal has a high level. The signal S2 is generated to be synchronized with the signal Vosc1. The signal LO is an output of the latch circuit 23 and turns off the NMOS transistors Q1 to Q4 forcedly when the signal has a high level. Note that the latch circuit 23 is reset by the reset signal RST. The motor current ID is a current flowing in the NMOS transistor Q2. The voltage Va at the node a is expressed as a product of ID and RQ2 (ID×RQ2). The signal Vosc2 is generated by dividing a frequency of the signal Vosc1, and the PMOS transistor Q5 and the NMOS transistor Q6 are biased by the signal Vosc2. The voltage Vb at the node b has a value of 0 or VREF in synchronization with the signal Vosc2. The comparison result signal CPO is a signal indicating a comparison result between the voltage Va and the voltage Vb.

First, an operation in the normal state is described. When the signal S2 becomes a high level, the NMOS transistor Q2 is turned on so that the motor current ID starts to flow in accordance with the equation (1). When the motor current ID occurs, the voltage Va is generated by a voltage drop due to the ON resistance RQ2. On the other hand, the signal Vosc2 falls in synchronization with the signal S2, whereby the PMOS transistor Q5 is turned on, and VREF (=Vb) appears at the node b. The comparator COMP outputs the comparison result between Va and Vb. Vb is larger than Va in the normal state, and thus the comparison result signal CPO has a high level. The detection time point illustrated in FIG. 5 is set corresponding to the time period after the NMOS transistor Q2 is turned on until the NMOS transistor Q2 is turned off to become the load short circuit state, and may be set freely by the control circuit 20. In FIG. 5, one pulse time of the signal Vosc1 is set as the detection time point. At the detection time point illustrated in FIG. 5, the control circuit 20 detects the comparison result signal CPO. The control circuit 20 determines that the motor 10 is in the normal state because the comparison result signal CPO is a high level, and accordingly the NMOS transistor Q2 is continuously turned on.

Next, in the load short circuit state, current supply to the motor 10 is started when the NMOS transistor Q2 is turned on, but the motor current ID rises rapidly and a saturation voltage increases. Therefore, the voltage Va becomes higher than the voltage Vb at the detection time point, and the comparison result signal CPO becomes a low level. The control circuit 20 determines that the motor 10 is in the short circuit state because the comparison result signal CPO is a low level at the detection time point, and makes the signal LO be a high level so that the signal S2 is changed to be a low level. Thus, the NMOS transistor Q2 is forced to be turned off, and the current supply through the NMOS transistor Q2 is stopped.

According to the load driving circuit described above, a short circuit may be detected in a short period of time after starting of current supply to the motor 10, whereby the switching device may be turned off quickly. Therefore, it is possible to prevent an excessive current from flowing in the switching device when a short circuit occurs, whereby the circuit may be protected.

In addition, as described above, the saturation voltage becomes substantially zero in the normal state and becomes substantially VDD/2 in the short circuit state (with a resistance of zero). If VDD is 10 volts, the saturation voltage becomes substantially zero in the normal state and becomes approximately 5 volts in the short circuit state. Therefore, an input voltage of the comparator COMP has a value within a range of from 0 to 5 volts.

In the conventional technology, a resistor element having low resistance is used as the current sensing resistor (shunt resistor) for current detection. For instance, if a resistance of a current sensing resistor RL=1 milliohms, RQ3+RQ2+RL=100 milliohms, and VDD=5 volts, a current of 50 amperes flows in the load short circuit state, and a voltage of 0.05 volts is generated across the current sensing resistor RL. If it is intended to detect a short circuit at 20 amperes, Vref as a reference voltage should be set to 0.02 volts, so as to turn off the MOS transistor when Va becomes 0.02 volts. In this case, a challenge is an error accuracy of the comparator. If an input offset voltage of the comparator to be used is ±10 millivolts, an error occurs in a detection range at a voltage of from 0.01 to 0.03 volts, which is converted into a current corresponding to a detection error of ±50% of from 10 to 30 amperes. If the current in the normal state is larger than 10 amperes, a malfunction may occur.

In contrast, according to the present invention, a variation range of the voltage Va is 0 to 5 volts as described above. Therefore, the voltage Vb at the detection time point may be set to a high value. For instance, an error in the case where the voltage Vb at the detection time point is set to 1 volt becomes ±1% at an input offset voltage (10 millivolts)/1 volts when the same comparator as that of the above-mentioned example, and hence detection accuracy may be improved.

Second Embodiment

Figure 6:
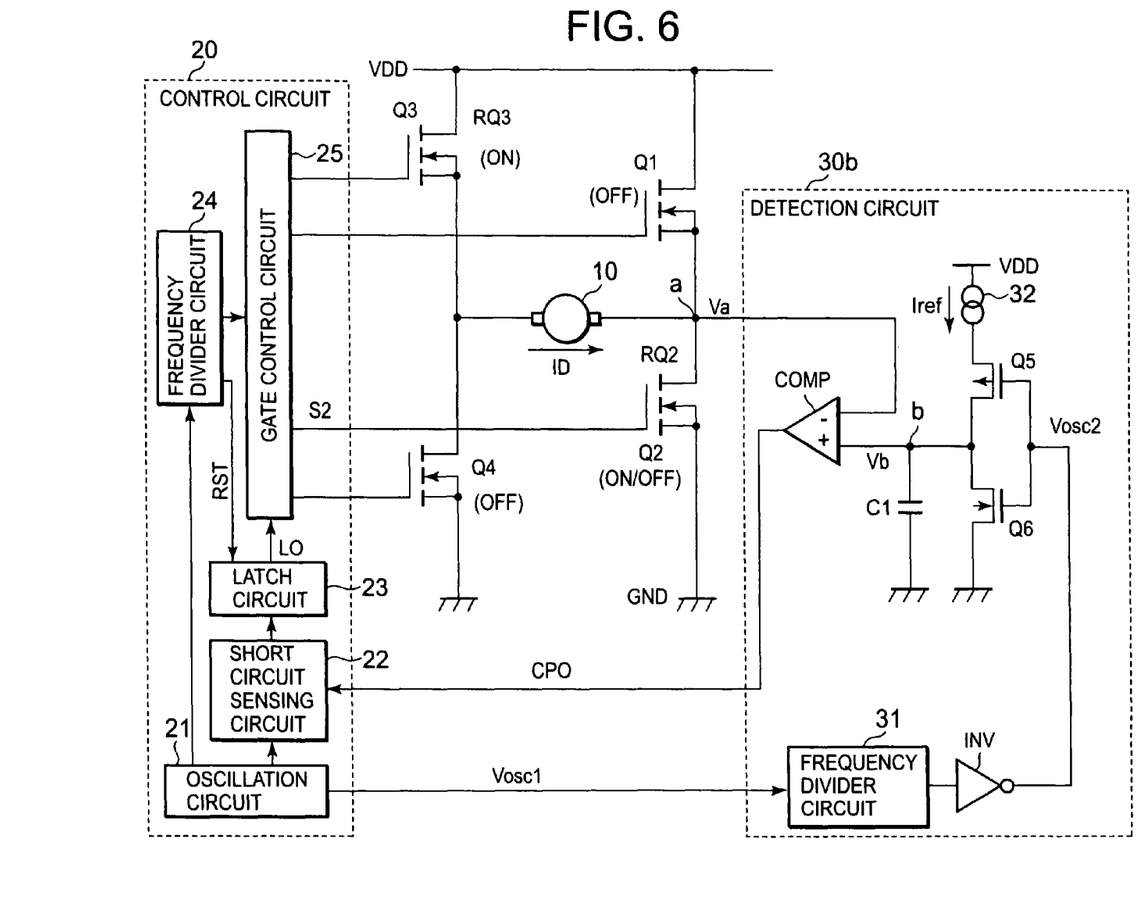
FIG. 6 is a block diagram illustrating a structure of a load driving circuit according to a second embodiment of the present invention.

FIG. 6 is a block diagram illustrating a structure of a load driving circuit according to a second embodiment of the present invention. In FIG. 6, the same reference numeral or symbol as that of FIG. 1 denotes the same element, and description thereof is omitted. In this embodiment, a capacitor element (capacitor) C1 is added to be connected between the noninverting input terminal (+) of the comparator COMP and the ground in a detection circuit 30b of the load driving circuit. The source of the PMOS transistor Q5 is connected to the power source VDD via a constant current circuit 32.

The constant current circuit 32 charges the capacitor element C1 by constant current Iref in the case where the PMOS transistor Q5 is turned on. The voltage Vb at the node b as one terminal of the capacitor element C1 increases as charge is accumulated, and it is expressed by "Vb=Iref×t/C1". In other words, when the capacitor element C1 is charged by a constant current, the voltage Vb is expressed by a function of time that increases linearly. Note that an increasing rate of the voltage Vb per unit time may be easily adjusted by changing the current Iref.

It can also be said that a variation amount of the voltage Va per unit time, i.e., dVa/dt (=RQ2×dID/dt) is detected with respect to dVb/dt in this embodiment. In this case, values of C1 and Iref are adjusted so that dVb/dt corresponds to a straight dotted line d passing through the region D illustrated in FIG. 4, and the detection time point for detecting a load short circuit is set in the region D.

Figure 7:
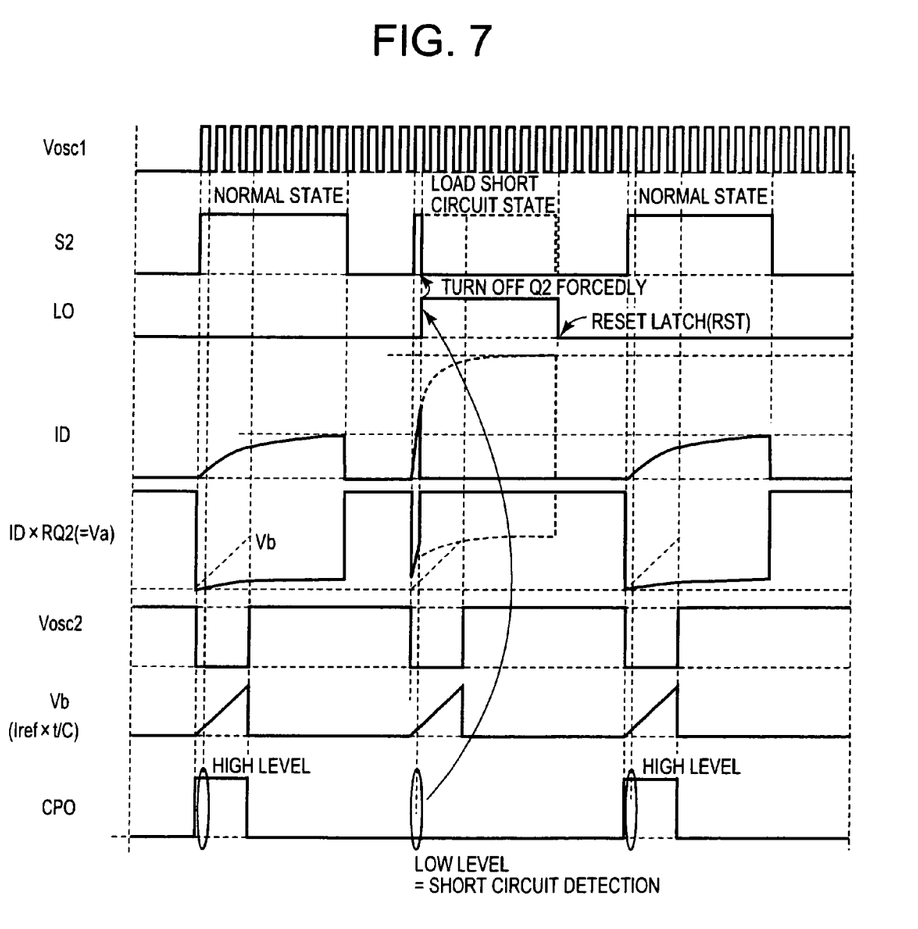
FIG. 7 is a timing chart illustrating an operation of the load driving circuit according to the second embodiment of the present invention.

FIG. 7 is a timing chart illustrating an operation of the load driving circuit according to the second embodiment of the present invention. As illustrated in FIG. 7, the operation of the load driving circuit is the same as that of the load driving circuit according to the first embodiment except that a waveform of the voltage Vb is different from that of FIG. 5.

Third Embodiment

Figure 8:
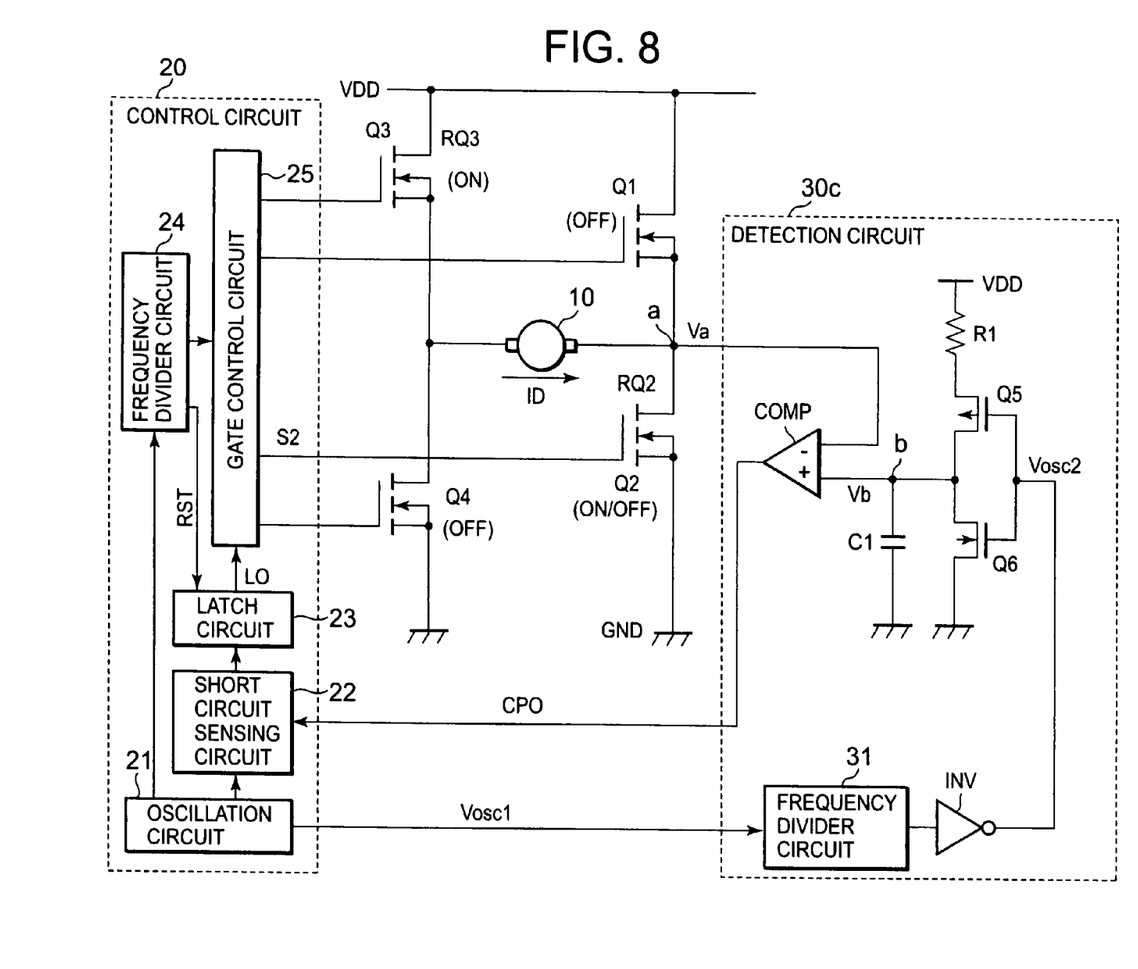
FIG. 8 is a block diagram illustrating a structure of a load driving circuit according to a third embodiment of the present invention.

FIG. 8 is a block diagram illustrating a structure of a load driving circuit according to a third embodiment of the present invention. In FIG. 8, the same reference numeral or symbol as that of FIG. 6 denotes the same element, and description thereof is omitted. In a detection circuit 30c of the load driving circuit according to this embodiment, the source of the PMOS transistor Q5 is connected to the power source VDD via a resistor element R1.

The capacitor element C1 is charged by the constant current Iref in the load driving circuit according to the second embodiment, but the capacitor element C1 is charged via the resistor element R1 in this embodiment. Therefore, the voltage Vb changes linearly in the second embodiment while the voltage Vb changes exponentially to be saturated in this embodiment. However, a gradient of the voltage Vb at the leading edge from the ground (GND) level or in its vicinity may be set substantially similarly to the second embodiment also in the third embodiment by setting a value of R1 to be VDD/Iref.

It is apparent that the present invention is not limited to the above embodiments, but may be modified and changed without departing from the scope and spirit of the invention. Although the invention has been described above in connection with several preferred embodiments thereof, it would be appreciated by those skilled in the art that those embodiments are provided solely for illustrating the invention, and should not be relied upon to construe the appended claims in a limiting sense.

What is claimed is:

1. A load driving circuit, comprising:
a switching device for intermittently connecting an inductive load to a power source;
a detection circuit for detecting a voltage at a connection node between the switching device and the inductive load a predetermined time after the switching device connects the inductive load to the power source; and
a control circuit for controlling the switching device so as to cut off a power supply to the inductive load in accordance with the detected voltage at the connection node.

2. A load driving circuit according to claim 1, wherein the control circuit controls the switching device so as to cut off the power supply to the inductive load when the voltage at the connection node is within a range in which the inductive load is determined to be short-circuited.

3. A load driving circuit according to claim 1, wherein the detection circuit includes a comparator circuit for comparing the voltage at the connection node with a predetermined voltage, so as to detect the voltage at the connection node based on a comparison result of the comparator circuit.

4. A load driving circuit according to claim 3, further comprising a charging and discharging circuit including a capacitor element, wherein, after the switching device connects the inductive load to the power source so that a charging and discharging of the capacitor element is started, the comparator circuit compares the voltage at the connection node with a voltage at a charging and discharging end of the capacitor element as the predetermined voltage.

5. A load driving circuit according to claim 4, wherein the charging and discharging circuit further includes a constant current circuit so as to perform the charging and discharging of the capacitor element with a current from the constant current circuit.

6. A load driving circuit according to claim 4, wherein the charging and discharging circuit further includes a resistor element so as to perform the charging and discharging of the capacitor element with a current from the power supply via the resistor element.

7. A load driving circuit according to claim 1, wherein the inductive load includes a motor, and
wherein the detection circuit and the control circuit comprise parts of a motor driving device.

8. A load driving circuit according to claim 1, wherein the inductive load comprises a motor.

9. A load driving circuit according to claim 1, wherein the detection circuit includes:
a comparator circuit that compares the voltage at the connection node with a predetermined voltage; and
a first transistor configured to supply the predetermined voltage to the comparator circuit,
wherein the comparator outputs a comparison result to the control circuit.

10. A load driving circuit according to claim 9, wherein the detection circuit further includes a second transistor comprising a first terminal connected to a ground source and a second terminal connected to a terminal of the first transistor.

11. A load driving circuit according to claim 10, wherein the detection circuit further comprises a frequency divider circuit that controls a gate of the first transistor and a gate of the second transistor.

12. A load driving circuit according to claim 9, wherein the detection circuit further includes a capacitor, and wherein the first transistor and the comparator circuit connect to form a node, and the capacitor is connected to the node.

13. A load driving circuit according to claim 12, wherein, when the capacitor is charged, the predetermined voltage rises linearly.

14. A load driving circuit according to claim 1, wherein the detection circuit detects a short circuit in the inductive load.

15. A load driving circuit according to claim 1, wherein the switching circuit comprises a transistor, and when the transistor is turned on, the transistor connects the inductive load to the power source.

16. A load driving circuit according to claim 1, wherein, when the detection circuit detects that the voltage at the connection node is greater than a predetermined voltage in the detection circuit during the predetermined time, the switching device cuts off the power supply to the inductive load.

17. A load driving circuit according to claim 16, wherein, when the voltage at the connection node is detected to be greater than the predetermined voltage, the detection circuit outputs a first signal to the control circuit, and the control circuit outputs a second signal to the switching device to forcedly cut off the power supply to the inductive load.

18. A load driving circuit according to claim 9, wherein the first transistor comprises a first terminal that is connected to a constant current circuit.

19. A load driving circuit according to claim 9, wherein the first transistor comprises a first terminal that is connected to a resistor.

20. A load driving circuit according to claim 1, wherein the control circuit comprises a short circuit sensing circuit that receives a signal from the detection circuit, and the short circuit sensing circuit determines a state of the inductive load.

* * * * *